United States Patent
Maeng et al.

(10) Patent No.: US 11,287,126 B2
(45) Date of Patent: Mar. 29, 2022

(54) SYSTEM AND METHOD FOR CONTROLLING OPERATION OF BOILER

(71) Applicant: DOOSAN HEAVY INDUSTRIES & CONSTRUCTION CO., LTD., Changwon-si (KR)

(72) Inventors: Jwa Young Maeng, Yongin-si (KR); Sang Gun Na, Yongin-si (KR)

(73) Assignee: Doosan Heavy Industries & Construction Co., Ltd, Changwon-si (KR)

(*) Notice: Subject to any disclaimer, the term of this patent is extended or adjusted under 35 U.S.C. 154(b) by 0 days.

(21) Appl. No.: 16/566,877

(22) Filed: Sep. 11, 2019

(65) Prior Publication Data

US 2020/0173650 A1 Jun. 4, 2020

(30) Foreign Application Priority Data

Nov. 30, 2018 (KR) ........................ 10-2018-0152750

(51) Int. Cl.
| | |
|---|---|
| *F22B 35/18* | (2006.01) |
| *G05B 13/02* | (2006.01) |
| *G05B 13/04* | (2006.01) |
| *F22B 37/38* | (2006.01) |

(52) U.S. Cl.
CPC .............. *F22B 35/18* (2013.01); *F22B 37/38* (2013.01); *G05B 13/027* (2013.01); *G05B 13/042* (2013.01)

(58) Field of Classification Search
CPC ..... G05B 17/02; G05B 13/042; G05B 13/048
See application file for complete search history.

(56) References Cited

U.S. PATENT DOCUMENTS

| | | | |
|---|---|---|---|
| 2004/0050306 A1* | 3/2004 | Manos | F23K 3/02 |
| | | | 110/101 C |
| 2009/0132095 A1 | 5/2009 | Sekiai et al. | |
| 2010/0049561 A1 | 2/2010 | Lou et al. | |

(Continued)

FOREIGN PATENT DOCUMENTS

| | | |
|---|---|---|
| CN | 101498459 A | 8/2009 |
| CN | 102880795 A | 1/2013 |

(Continued)

OTHER PUBLICATIONS

Jung Hae Won, system for controlling optimized combustion on boiler, 2016, google patents, pp. 1-8 (Year: 2016).*

(Continued)

*Primary Examiner* — Michelle T Bechtold
*Assistant Examiner* — Yvonne Trang Follansbee
(74) *Attorney, Agent, or Firm* — Invenstone Patent, LLC (57) ABSTRACT

A system for controlling a boiler in a power plant to ensure combust under optimized conditions is provided. The system for controlling an operation of the boiler may include an optimizer configured to perform a combustion optimization operation for the boiler using a boiler combustion model to calculate an optimum control value for at least one control object of the boiler, and an output controller configured to receive the calculated optimum control value from the optimizer and control the control object according to the optimum control value.

17 Claims, 6 Drawing Sheets

(56) References Cited

U.S. PATENT DOCUMENTS

| | | | | |
|---|---|---|---|---|
| 2010/0319592 A1* | 12/2010 | Dohalick | ................ | F23K 3/02 110/186 |
| 2013/0006428 A1* | 1/2013 | Antoine | ................ | F23N 5/003 700/286 |
| 2016/0091203 A1* | 3/2016 | Wang | ................ | F23N 1/022 700/274 |
| 2016/0109895 A1* | 4/2016 | Schindler | ................ | G05F 1/66 700/291 |
| 2019/0107293 A1* | 4/2019 | Braier | ................ | F24D 19/10 |

FOREIGN PATENT DOCUMENTS

| | | | | | |
|---|---|---|---|---|---|
| CN | 105276611 | A | | 1/2016 | |
| CN | 105444201 | A | * | 3/2016 | ............ F23N 5/022 |
| CN | 105444201 | A | | 3/2016 | |
| CN | 106446419 | A | * | 2/2017 | |
| CN | 106446419 | A | | 2/2017 | |
| CN | 106681281 | A | | 5/2017 | |
| JP | 2004005250 | A | | 1/2004 | |
| JP | 2013178045 | A | | 9/2013 | |
| JP | 2016102597 | A | | 6/2016 | |
| JP | 2016205678 | A | | 12/2016 | |
| KR | 19980031711 | A | | 7/1998 | |
| KR | 101484496 | B1 | | 1/2015 | |
| KR | 101515457 | B1 | | 5/2015 | |
| KR | 20160104481 | A | * | 9/2016 | |
| KR | 1020160104481 | A | | 9/2016 | |
| KR | 101810968 | B1 | | 12/2017 | |
| WO | WO-2019208773 | A1 | * | 10/2019 | ............ G05B 19/418 |
| WO | WO-2020105629 | A1 | * | 5/2020 | ............ F02C 6/00 |

OTHER PUBLICATIONS

Chen Yao, Combustion optimization method and system thereof, 2016, google patents, pp. 1-6 (Year: 2016).*

Chen Wen, Modeling method and system of coal-fired boiler in thermal power plant, 2017, google patents, pp. 1-8 (Year: 2017).*

Jun, Pulverized coal drying system for coal pulverizer and pulverized coal drying method therefor, and pulverized coal drying program, coal pulverizer, and gasification combined cycle facility, 2020, google patents, translation of WO2020105629A1 (Year: 2020).*

Yoshida, Operation assistance device for plant, operation assistance method for plant, learning model creation method for plant, operation assistance program for plant . . . , 2019, google patents, translation of WO2019208773A1 (Year: 2019).*

A German Office Action dated Jan. 15, 2021 in connection with Korean Patent Application No. 10-2018-0152750 which corresponds to the above-referenced U.S. application (English translation attached).

* cited by examiner

SYSTEM AND METHOD FOR CONTROLLING OPERATION OF BOILER

CROSS REFERENCE TO RELATED APPLICATION

This application claims priority to Korean Patent Application No. 10-2018-0152750, filed on Nov. 30, 2018, the entire disclosure of which is incorporated herein by reference in its entirety.

BACKGROUND

1. Field

Apparatuses and methods consistent with exemplary embodiments relate to a system for controlling a boiler apparatus in a power plant to ensure combustion under optimized conditions, and more particularly, to a system for controlling an operation of a boiler on the basis of optimum control values for control objects of the boiler, the optimum control values being calculated by an internal algorithm for minimizing emissions while improving boiler combustion efficiency, and a method therefor.

2. Description of the Related Art

A thermal power plant has a boiler therein to heat water by using an exothermic reaction generated when burning fuel such as coal or the like, thereby producing steam for driving a turbine. When a combustion occurs in the boiler, emissions such as nitrogen oxides and carbon dioxide are generated. In recent years, the combustion environment is controlled to generate less emission because an operation of the power plant requires considerable cost to manage such emissions, and efforts are being made to increase the combustion efficiency of boilers.

In a related art thermal power plant, a boiler control, that is, combustion control, has been performed, by a skilled expert by adjusting combustion environment parameters of a boiler with reference to performance test data during a trial run, and then starting a boiler operation. In addition, after the boiler operation has been started, the combustion control is performed by fine-tuning an offset value. Therefore, according to the related art boiler operating method, because it is not easy to control the boiler in an optimum combustion state when the boiler is operating, stable combustion control for the stability of the boiler has been given more priority than the optimum control thereof. There has been a problem in the related art that the optimum combustion environment of a boiler could not be properly implemented.

In order to solve the problem, studies have been made to optimize combustion control of the boiler by automatically acquiring and analyzing operating data of a boiler in real time and automatically adjusting various control variables of the boiler according to the analyzed result.

SUMMARY OF THE INVENTION

Aspects of one or more exemplary embodiments provide a system and method for controlling a boiler in a power plant to maximize the combustion efficiency of the boiler while minimizing the generation of emissions including nitrogen oxides and carbon oxides.

Aspects of one or more exemplary embodiments provide a method for controlling an operation of a boiler in real time, and particularly, at controlling an operation of a boiler in real time within limits not excessively affecting a current boiler state according to a value calculated by an optimization operation.

Additional aspects will be set forth in part in the description which follows and, in part, will become apparent from the description, or may be learned by practice of the exemplary embodiments.

According to an aspect of an exemplary embodiment, there is provided a system for controlling an operation of a boiler, the system including: an optimizer configured to perform a combustion optimization operation for the boiler using a boiler combustion model to calculate an optimum control value for at least one control object of the boiler; and an output controller configured to receive the calculated optimum control value from the optimizer and control the control object according to the optimum control value.

The output controller may receive an updated optimum control value from the optimizer for a preset period of time.

The output controller may control the control object with the optimum control value for a plurality of sub-periods of time each shorter than the preset period of time.

The output controller may control the control object by a variation allowed during the sub-period of times for each sub-period of time.

The preset period of time may be divided into a plurality of sub-periods of time, and the control object may be controlled by a same variation for each sub-period of time.

The system may further include a task manager configured to collect at least one of operation data and state data of a boiler that is in operation, and determine whether to perform the combustion optimization operation for the boiler based on the at least one operation data or state data.

The operation data may include at least one of a power generation output, a command value and an instantaneous value, and wherein the state data includes at least one of a fluctuation in a boiler output, a fuel fluctuation, and a temperature or pressure in each component of the boiler.

The system may further include a modeler configured to create a boiler combustion model to be used for an operation in the optimizer.

The system may further include a pre-processor configured to filter data required for the modeler to create an arbitrary boiler combustion model.

According to an aspect of another exemplary embodiment, there is provided a method for controlling an operation of a boiler, the method including: performing, by an optimizer, a combustion optimization operation for the boiler using a boiler combustion model to calculate an optimum control value for at least one control object of the boiler; and controlling, by an output controller, the control object according to the optimum control value.

The calculating the optimum control value may be performed for a preset period of time.

In the controlling the control object, the control object may be controlled with the optimum control value for a plurality of sub-periods of time each shorter than the preset period of time.

In the controlling the control object, the control object may be controlled by a variation allowed during the sub-period of time.

In the controlling the control object, the preset period of time may be divided into a plurality of sub-periods of time, and the control object may be controlled by a same variation for each sub-period of time The method may further include: collecting, by a task manager, at least one of operation data and state data of a boiler that is in operation, and determining, by the task manager, whether to perform the combustion optimization operation for the boiler based on the at least one operation data or state data.

The operation data may include at least one of a power generation output, a command value and an instantaneous value, and wherein the state data may include at least one of a fluctuation in a boiler output, a fuel fluctuation, and a temperature or pressure in each component of the boiler.

The method may further include creating, by a modeler, a boiler combustion model to be used in the combustion optimization operation for the boiler, wherein the boiler combustion model is created by using an artificial neural network.

The method may further include filtering, by a pre-processor, data required in the creating the boiler combustion model.

According to an aspect of another exemplary embodiment, there is provided a non-transitory computer-readable storage medium storing instructions of executing a method of controlling an operation of a boiler, the method including: performing a combustion optimization operation for the boiler using a boiler combustion model to calculate an optimum control value for at least one control object of the boiler; and controlling the control object according to the optimum control value.

According to one or more exemplary embodiments, the combustion efficiency of the boiler in a power plant can be improved and the emissions causing environmental pollution can also be minimized, whereby the cost of treating the emissions can be significantly reduced, thereby significantly reducing the operating cost of the power plant.

Further, the control objects can be controlled gradually up to a set point calculated by the optimization operation within limits not excessively affecting the current operation state of the boiler in controlling the operation of the boiler in real time, thereby preventing the occurrence of problems caused by a sudden change in the operation state.

BRIEF DESCRIPTION OF THE DRAWINGS

The above and other aspects will be more apparent from the following description of the exemplary embodiments with reference to the accompanying drawings, in which.

DETAILED DESCRIPTION OF THE DISCLOSURE

Various modifications may be made to the embodiments of the disclosure, and there may be various types of embodiments. Thus, specific embodiments will be illustrated in drawings, and embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

Unless otherwise defined, the terms including technical and scientific terms used herein have the same meaning as would be generally understood by those skilled in the relevant art. However, these terms may vary depending on the intentions of the person skilled in the art, legal or technical interpretation, and the emergence of new technologies. In addition, some terms are arbitrarily selected by the applicant. These terms may be construed per the meaning defined or described herein and, unless otherwise specified, may be construed on the basis of the entire contents of this specification and common technical knowledge in the art.

The functional blocks illustrated in the drawings and described below are only examples of possible implementations. Other functional blocks may be used in other implementations without departing from the spirit and scope of the detailed description. Also, while one or more functional blocks of the present disclosure are represented by separate blocks, one or more of the functional blocks may be a combination of various hardware and software configurations that perform the same function.

Also, "a module" or "a part" in the disclosure perform at least one function or operation, and these elements may be implemented as hardware or software, or as a combination of hardware and software. Further, a plurality of "modules" or "parts" may be integrated into at least one module and implemented as at least one processor, except "modules" or "parts" that need to be implemented as specific hardware.

The terminology used herein is for the purpose of describing particular embodiments only and is not intended to limit the scope of the disclosure. As used herein, the singular forms "a", "an", and "the" are intended to include the plural forms as well unless the context clearly indicates otherwise. Further, the terms "comprises", "includes", or "have/has" should be construed as designating that there are such features, regions, integers, steps, operations, elements, components, and/or a combination thereof in the specification, not to exclude the presence or possibility of adding one or more of other features, regions, integers, steps, operations, elements, components and/or combinations thereof.

In addition, terms concerning attachments, coupling and the like, such as "connected" and "coupled" refer to a relationship in which structures are secured or attached to one another either directly or indirectly through intervening structures.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 1:
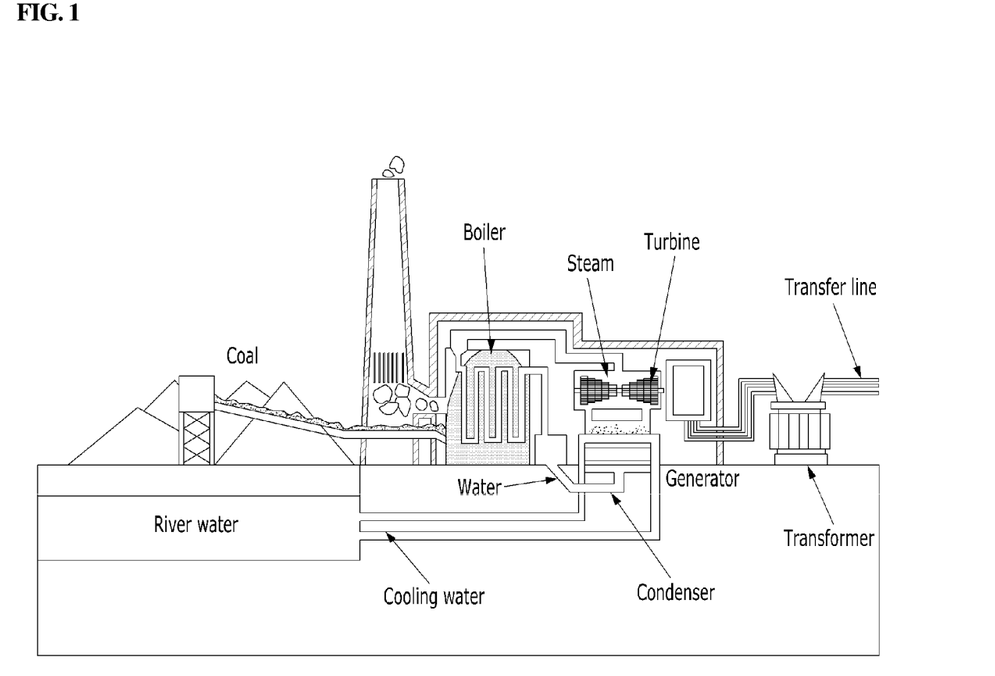
FIG. 1 is a schematic diagram illustrating a general configuration of a thermal power plant.

FIG. 1 illustrates a general configuration of a thermal power plant, in particular for illustrating a position and role of a boiler to be controlled. Thermal power plants generate steam from coal or petroleum-fired power to turn steam turbines and produce electrical energy. Boiler in the thermal power plant serves to boil water by burning fuel so as to supply high-temperature and high-pressure steam to steam turbines. The boiler may include a boiler body containing water and steam, a combustor for combusting a fuel, and a furnace. The combustor, the furnace, and the like are controlled by a control system to control temperature, pressure, and the like.

Boiler control is a key control operation in the power plant. In the past, because the control operation of the boiler has been a very complicated process, a skilled expert is necessary for normal operation. Recently, by adopting an automated control method in operating the boiler, a system for boiler control is implemented without manual manipulation. This automated control method enables real-time control of the boiler. Further, in order to increase the combustion efficiency of the boiler, a control that is gradually close to real time by controlling the boiler such that a current state of the boiler is checked in every short period of time may be implemented, and respective control operations may be performed on control targets according to the current state.

The exemplary embodiment provides a system and method for controlling an operation of a boiler that can improve the combustion efficiency and reduce emission by adding, to a currently available boiler control system and method, (i) generation and update of a boiler combustion model utilizing artificial intelligence, and (ii) an optimization operation for finding an optimal set point for each control target with reference to the status of a boiler in operation. Further, the exemplary embodiment provides a method of effectively controlling an operation of a boiler in real time through Dynamic Bias Tracking Techniques.

Figure 2:
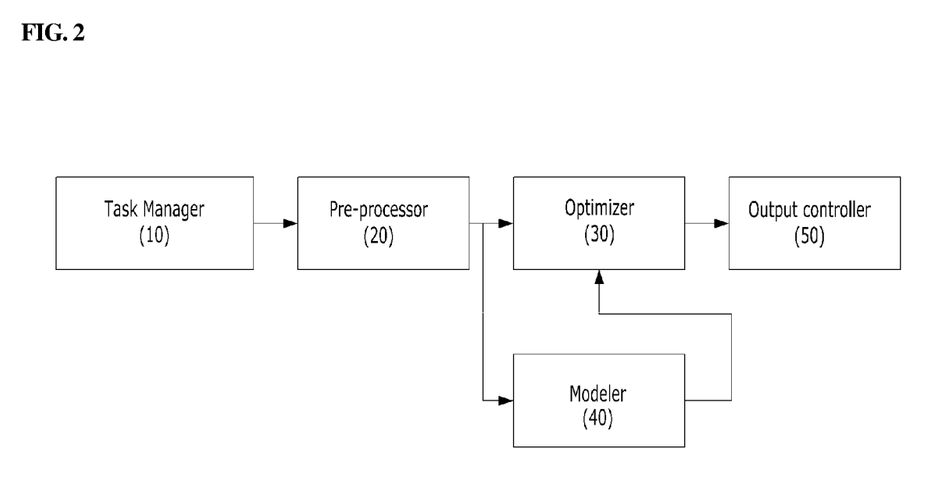
FIG. 2 is a block diagram illustrating the configuration of a boiler control system according to an exemplary embodiment.

FIG. 2 illustrates a block diagram of a boiler control system according to an exemplary embodiment. Referring to FIG. 2, the boiler control system includes a task manager 10, a pre-processor 20, an optimizer 30, a modeler 40, and an output controller 50. Although the boiler control system of FIG. 2 includes configuration blocks designated by functions or steps to be performed, it will be appreciated that the boiler control system may be implemented as a device, including a CPU for operation and a memory that can store program and data for operation, and that the above configurations of the boiler control system may be implemented on a program designed in a computer-readable language, and executed by the CPU. Further, the boiler control system may be implemented by hardware or firmware, software, or a combination thereof. When implemented using hardware, the boiler control system may include an application specific integrated circuit (ASIC), or a digital signal processor (DSP), a digital signal processing device (DSPD), a programmable logic device (PLD), a field programmable gate array (FPGA), and the like. When implemented using firmware or software, the boiler control system may include a module, procedure, or function that performs the above functions or operations.

The task manager 10 is configured to check a current operating state of the boiler and determine whether to perform a boiler combustion optimization. For example, the task manager 10 may collect operation data and state data (e.g., state binary value) of the boiler that is in operation, and based on this, determine whether the boiler combustion optimization is possible (i.e., whether to perform the boiler combustion optimization) based on the collected data. The operation data of the boiler includes measurements received from various sensors installed in the currently operating boiler, or control values that can be monitored by the boiler control system. Examples of the operation data may include power output (MW), commands, and the like. The state data includes values that indicate fluctuations in boiler output, fuel fluctuations, temperature and pressure in each component, and so on.

The task manager 10 determines whether combustion optimization is necessary or possible based on the collected operation data and state data. In this determination process, integrity of the boiler system (e.g., the operating state of the hardware, the system resource status, communication environment, etc.), and integrity of respective modules in the boiler system (e.g., the operating state of software, the existence of the boiler combustion model, etc.) are considered. For example, the task manager 10 may determine that the power plant is not stabilized in a section in which the power output changes drastically. For example, when the power output (e.g., 50 MW) changes tens of megawatts (e.g., 50 MW) over a reference value for 30 minutes, the task manager 10 may determine that it is an unstable state and may not proceed with the combustion optimization.

There are three analysis methods to determine whether the combustion optimization is necessary or possible. The analysis methods include an analysis method based on boiler operation data, an analysis method based on a state binary value, and an analysis method based on previously recorded and stored expert's knowledge and experience. These analysis methods may be used unitarily or in combination by the task manager 10 to determine whether to perform the combustion optimization. The analysis method based on the expert's knowledge and experience, which are recorded and stored in advance, is configured such that the analysis is performed based on previously stored data including operating states of a boiler and corresponding manipulations by an expert who operates the boiler. For example, expert's manipulation such as a supply B of fuel to a combustion chamber of a boiler if the temperature in the combustion chamber is A, and expert's manipulation such as an adjustment of a damper angle to D if the temperature in the combustion chamber is C may be stored and will be referred to later for analysis.

The pre-processor 20 is configured to pre-filter only data suitable for modeling, that is, data suitable for learning by the modeler 40. While a quantity of input data that can be collected from the boiler, and output data according to the input data is very greater, some data include some error values that are unmatched or less correlated, which reduces the accuracy of modeling. The pre-processor 20 may be a configuration required to further improve the accuracy when generating a model in the modeler 40 by filtering such unnecessary data in advance.

The pre-processor 20 performs signal restoration, filtering, and outlier processing functions. The signal restoration function is configured to restore signals collected from the boiler when there is some loss in the signals, or to restore the corresponding signal when the boiler has an abnormality or failure. The filtering function is configured to filter out, among the restored signals, data outside a normal data range or remove signal noise, and to further extract only data to be used for modeling, optimization operation, and output control, using a known knowledge-based logic. The outlier processing function is configured to process out-of-trend data, using a data-based logic.

The pre-processor 20 may be implemented to further perform a tag clustering function and a data sampling function according to a designer's intention or a user's need. Here, the tag clustering function serves to construct one data group by deleting unnecessary tag information and extracting only relevant tag information, among tags corresponding to respective control targets of a boiler. The data sampling function serves to operate data patterns and sample data according to a sampling algorithm to output learning data required for modeling.

As described above, the pre-processor 20 serves to collect data associated with the operation of the boiler and process the data into a form suitable for future modeling.

The optimizer 30 is a configuration that calculates an input for creating an optimum combustion state using a boiler combustion model that is to be generated by the modeler 40. The optimizer 30 performs a function of receiving an optimization purpose selection from a user, a function of receiving a boiler combustion model from the modeler 40, and a function of performing a boiler combustion optimization using the boiler combustion model.

The function of receiving the optimization purpose selection from the user, i.e. an operator of the boiler control system, can first select a purpose to carry out the combustion optimization prior to executing the combustion optimization. The optimizer 30 may receive the user's selection by providing an interface to select a plurality of purposes. The plurality of purposes may include, for example, a cost optimization considering a cost as a top priority, an emission optimization considering an emission reduction as a top priority, and a device protection optimization considering a device protection as a top priority. It is understood that this is merely one example, and other purposes for optimization may be included. The optimizer 30 performs an optimization operation by applying different logics according to the user's selection of purposes received from the user.

Regarding the function of receiving the boiler combustion model from the modeler 40, the optimizer 30 requires a boiler combustion model in order to perform the optimization operation, in which the boiler combustion model may be composed of a combination of mathematical models including an artificial neural network, which may be generated through repeated learning by the modeler 40.

Regarding the function of performing the boiler combustion optimization operation, the optimizer 30 calculates an optimal input value as a final output value by executing a simulation with application of the user's purpose selection and the boiler combustion model. The algorithms or controllers used in this case may include Proportional-Integral-Derivative (PID) algorithms, Degree of Freedom (DOF) algorithms, Model Predictive Control (MPC) algorithms, Adaptive algorithms, Fuzzy algorithms, H-infinity algorithms, Linear Parameter Varying (LPV) Model-based algorithms, Particle Swarm Optimization algorithms, Genetic Algorithm (GA), etc.

The optimizer 30 performs an optimization operation according to the user's purpose selection and the boiler combustion model received from the modeler 40 to calculate the optimal input value required for boiler combustion control.

The modeler 40 generates a boiler combustion model that can be utilized in the optimizer 30. According to the exemplary embodiment, it is characterized in that the modeler 40 generates the boiler combustion model using an artificial neural network.

The artificial neural network is a data processing methodology that simulates an inductive learning ability by mathematically modeling an information processing structure of a brain composed of neurons. This data processing methodology has a main purpose of patterning correlation between input and output values, and predicting an output value from a new input value based on the derived pattern. The artificial neural network consists of parallel connection structures (layers) of nodes that play the role of neurons. Generally, the neural network has a serial connection of input layer-hidden layer-output layer. Alternatively, the neural network may be implemented to have a plurality of hidden layers to process the complicated correlation between input and output values. When using the artificial neural network, even if physical characteristics or correlation are not clearly known, it is possible to obtain learning of correlation only with input and output values, prediction of multiple outputs, and deriving of the correlation between input and output values without linear extrapolation for non-linear behavior.

The modeler 40 according to the exemplary embodiment may receive an input value and an output value related to boiler combustion from the pre-processor 20. Examples of the input data may include damper angles of a primary air and a secondary air, a damper angle of a combustion air nozzle (OFA), an amount of coal fed from a coal feeder, an ambient temperature, etc. Examples of the output data may include a boiler output, temperature and pressure of a combustion gas in the boiler, an amount of nitrogen oxides, carbon monoxide, and oxygen in the combustion gas, a spray flow rate of a reheater, and the like.

The modeler 40 generates a boiler combustion model similar to the actual operating state of the boiler by using an artificial neural network, and the generated boiler combustion model is provided to the optimizer 30.

The output controller 50 is configured to perform the combustion control of the boiler. The output controller 50 includes a function of checking a current operating state of the boiler prior to controlling the boiler, and a function of reflecting the optimum control value calculated by the optimizer 30 by applying the optimum control value to the existing boiler control logic.

Regarding the function of checking the operating state of the boiler, the output controller 50 needs to check the current operating state of the boiler prior to actually controlling the boiler. This is because even if the optimum control value calculated by the optimizer 30 is immediately reflected in the boiler operating state, the boiler may be in an unstable state or an error may occur, so the optimum control value should be appropriately divided and reflected according to the current operating state of the boiler.

The output controller 50 may maximize actual combustion efficiency of the boiler by inputting the optimum control value previously calculated by the optimizer 30 to the boiler that is in operation. Here, the output controller 50 performs Dynamic Bias Tracking on the calculated optimum control value, thereby reflecting the optimum control value in real time to the existing combustion logic of the boiler. For example, assuming that the optimum control value is a temperature value T100 in a combustion chamber of the boiler, if the current temperature in the combustion chamber is T1, the output controller 50 should perform a control operation to elevate the temperature from T1 to T100. Here, a sudden change in temperature may cause problems, so the temperature should be controlled in stages. In this case, the output controller 50 may change the temperature in stages while dividing a temperature range (to T100) to be changed into a plurality of continuous stage sub-ranges. For example, the output controller 50 may control the temperature to gradually elevate from T1 to T20 in a first stage time period, from T20 to T40 in a second stage time period, from T40 to T60 in a third stage time period, from T60 to T80 in a fourth stage time period, and from T80 to T100 in a final fifth stage time period. This time period is shorter than a time period in which the optimum control value is calculated by the optimizer 30. For example, assuming that the optimizer 30 calculates the optimum control value every 5 minutes, the output controller 50 may execute an operation control of the boiler every 10 seconds. That is, performing the operation control of the boiler in every short time periods is defined as dynamic bias tracking, which is provided for checking the operating state of the boiler in real time and at the same time, stably reflecting the optimum control value without a sudden change in the operation of the boiler. A description of the detailed configurations of the output control unit 50 and the process of controlling the boiler operation by the output control unit 50 will be described with reference to FIGS. 3 to 5, which will be described later.

Figure 3:
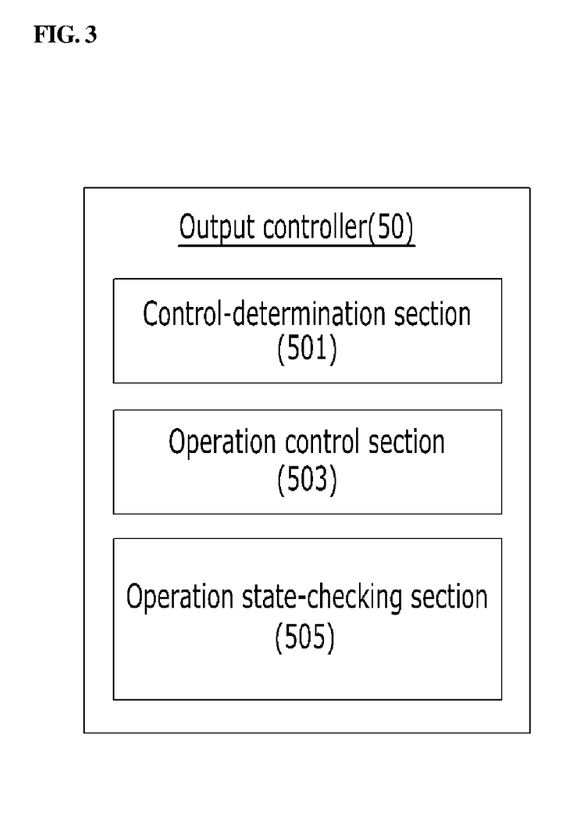
FIG. 3 illustrates a function of the output controller in the boiler control system according to an exemplary embodiment.

FIG. 3 illustrates a function of the output controller 50 in the boiler control system according to an exemplary embodiment. Referring to FIG. 3, the output controller 50 may include a control-determination section 501, an operation control section 503, and an operation state-checking section 505.

The control-determination section 501 is configured to determine whether to control the operation of the boiler. The determination may be the determination result by the task manager 10, or a current operation state of the boiler collected by the operation state-checking section 505. That is, the operation state-checking unit 505 may determine whether to continue the control of the boiler operation by referring to collected information or the determination result from other components before applying a change to the current boiler operation state.

The operation control section 503 is configured to control objects of the boiler that is currently operating, if the control-determination section 501 determines to control the boiler operation. The operation control section 503 controls respective control objects of the boiler by transmitting a control command to the control objects. Here, the operation control section 503 refers to an optimum control value, i.e., an optimal set point, calculated by the optimizer 30 so that any control object of the boiler is controlled according to the set point.

The optimizer 30 may calculate an optimum control value, i.e., an optimized set point, in every predetermined period of time. For example, the optimizer 30 may repeat the operation every several minutes to several tens of minutes. The calculated set point may be provided to the operation control section 503 in every period of time. If receiving the set point, the operation control section 503 controls the boiler operation according to the period of time. Here, the operation control section 503 controls the control objects by dynamic bias tracking.

Figure 4:
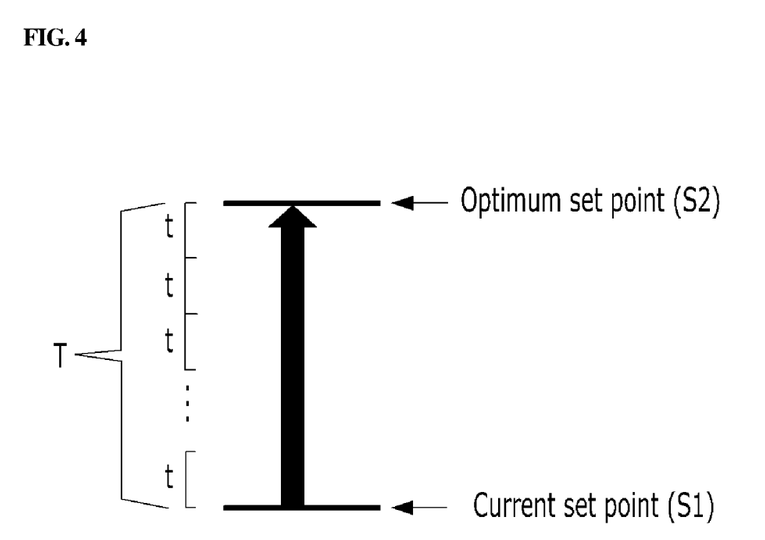
FIG. 4 is a diagram illustrating a method of controlling a boiler operation by the output controller referring to an optimized set point according to an exemplary embodiment.

FIG. 4 is a diagram illustrating a state in which the operation control section 503 controls an arbitrary control object of the boiler. For example, if the control object in the currently operating boiler has a set point S1, the operation control section 503 controls the control object to have a new set point S2 calculated by the optimizer 30. According to this, the operation control section 503 manipulates the control object to reach from the set point S1 to the set point S2 during a preset period of time T. In this case, the operation control section 503 gradually controls the control object by dividing the period of time T into a plurality of sub-periods of time and transmitting a control command for each sub-period of time. The sub-period of time t may range from several seconds to several tens of seconds, and the sub-period of time t should be shorter than the period of time T. In addition, the control from S1 to S2 is not necessarily performed over the period of time T, and the control may be terminated within a shorter time than T as necessary.

Figure 5:
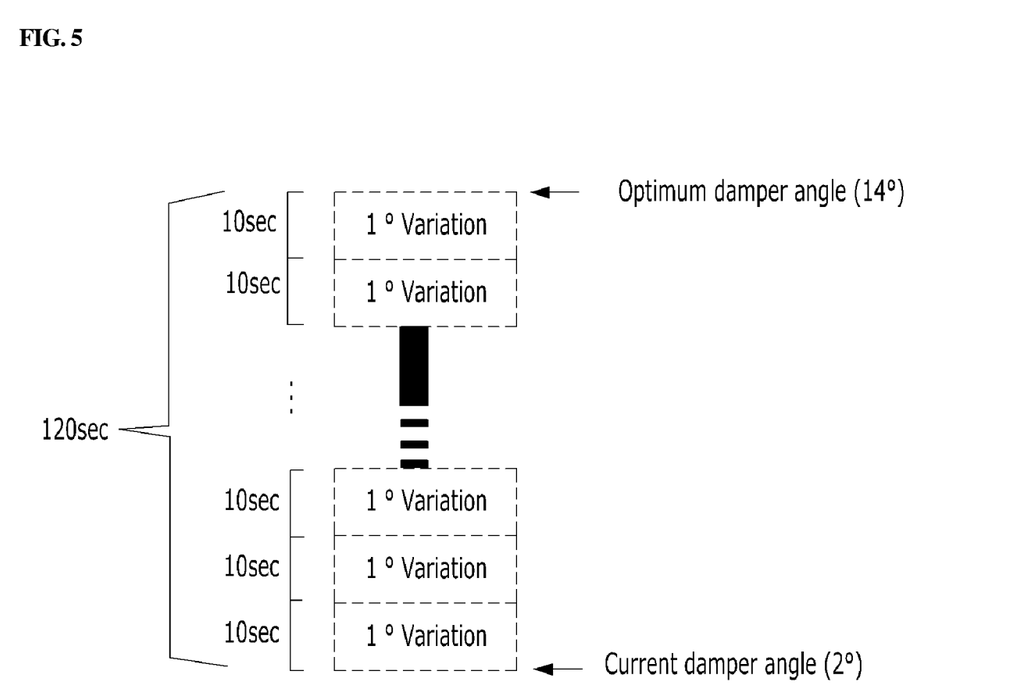
FIGS. 5 and 6 illustrate a state in which the output controller transmits a control command to any damper in the boiler according to an exemplary embodiment.
Figure 6:
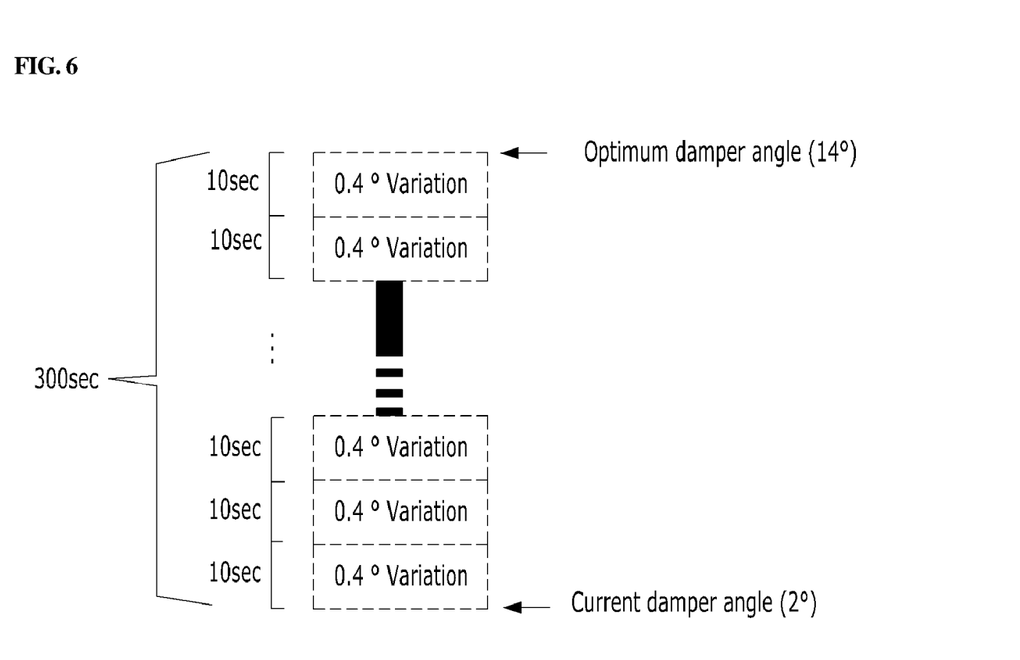

FIGS. 5 and 6 illustrate a process in which the operation control section 503 controls a damper in the boiler. For example, assuming that an open angle of the damper in the currently operating boiler (i.e., the current damper angle) is 2 degrees, and the set point calculated by the optimizer 30 (i.e., the optimum damper angle) is 14 degrees, the operation control section 503 needs to drive the damper from 2 degrees to 14 degrees. In this case, if such a sudden change occurs in a damper angle, an inflow of air will change rapidly, which may cause problems in the operation of the boiler. Accordingly, the operation control section 503 needs to gradually control the damper.

On the other hand, assuming that the operation control section 503 receives a new set point from the optimizer 30 every 5 minutes, the operation control section 503 gradually drives the damper within 5 minutes to implement boiler operation environments according to the set point.

FIG. 5 illustrates a first exemplary embodiment in which the operation control section 503 controls the damper. The operation control section 503 may divide a period of time into sub-periods of 10 seconds and control the damper to be opened to the maximum value that can be varied in 10 seconds. For example, assuming that the permissible fluctuation angle of the damper is 6 degrees per minute, the angle of the damper is permitted to vary by 1 degree per 10 seconds in calculation. As such, the operation control section 503 may control the angle up to the final set point, i.e. 14 degrees, by adjusting the angle of the damper by 1 degree per 10 seconds. Here, it can be easily understood that a total of 120 seconds, that is, 12 sub-periods of time are required to control the angle of the damper from 2 to 14 degrees. That is, FIG. 5 illustrates an exemplary embodiment in which it takes a total of 2 minutes (120 seconds) to control the damper, which is shorter than 5 minutes, which is a period of time in which the set point is calculated from the optimizer 30.

FIG. 6 illustrates a second exemplary embodiment in which the operation control section 503 controls the damper. The operation control section 503 may also perform a gradual control operation by dividing 5 minutes into sub-periods of 10 seconds, and distributing a difference between a target set point and a current set point for 30 sub-periods of time. That is, to control the damper angle from 2 degrees to 14 degrees, a change of 12 degrees in angle is required for 5 minutes, and the operation control section 503 may control the damper to have the set point by opening the damper by 0.4 degrees, which is a value obtained by dividing the 12 degrees by 30, every 10 seconds.

The method of controlling the control object of the boiler through the dynamic bias tracking has been described through FIGS. 5 and 6.

Referring again to FIG. 3, the output controller 50 includes the operation state-checking section 505, which is configured to collect information on the current operating state of the boiler. The operation state-checking section 505 may collect information on the operation state while the operation control section 503 controls the operation of the boiler, and the collected information may be referred to by the control-determination section 501 when determining whether to continue or stop the operation control of the boiler.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A system for controlling an operation of a boiler, the system comprising a central processing unit (CPU) including memory, the CPU configured to execute program steps of:
   collecting operation data and state data of the boiler while under operation;
   checking a current operating state of the boiler based on the collected operation data of the boiler and the collected state data of the boiler;
   determining, based on the checking, whether to perform a combustion optimization operation for the boiler;
   performing, based on the determination, the combustion optimization operation for the boiler using a boiler combustion model to calculate an optimum control value for a plurality of control objects of the boiler, the plurality of control objects including control of an amount of coal that is fed from a coal feeder to a combustion chamber of the boiler and an adjustment of a damper angle of each of a plurality of dampers installed in the boiler;
   updating the optimum control value for a preset period of time; and
   controlling the plurality of control objects of the boiler according to the optimum control value for a plurality of sub-periods of time each shorter than the preset period of time,
   wherein the collected operation data of the boiler includes measurements that are received from sensors installed in the currently operating boiler and that indicate each of:
      a power output generated by the amount of coal controlled according to the optimum control value;
      a command value configured to perform each of the control of the amount of coal that is fed from the coal feeder to the combustion chamber of the boiler, and the adjustment of the damper angle of each of the plurality of dampers; and
      an instantaneous value measured according to each of the controlled amount of coal, and the adjusted damper angle of each of the plurality of dampers, and
   wherein the collected state data of the boiler includes:
      a value indicating a fluctuation in a boiler output;
      a value indicating a fluctuation in the amount of the coal fed from the coal feeder;
      a value indicating a temperature in each of a plurality of components of the boiler; and
      a value indicating a pressure in each of the plurality of components of the boiler,
   wherein the plurality of components of the boiler includes the plurality of dampers installed in the boiler.

2. The system according to claim 1, wherein the plurality of control objects of the boiler are controlled by a variation allowed during each of the plurality of sub-periods of time.

3. The system according to claim 1,
   wherein the preset period of time is divided into the plurality of sub-periods of time, and
   wherein the plurality of control objects of the boiler are controlled by a same variation for each of the plurality of sub-periods of time.

4. The system according to claim 1,
   wherein the determining whether to perform the combustion optimization operation includes determining whether a power plant including the boiler is stabilized, and otherwise determining that the power plant is not stabilized, by considering an integrity of the system and an integrity of respective modules in the boiler,
   wherein the considering the integrity of the system includes considering an operating state of hardware, a system resource status, and a communication environment, and
   wherein the considering the integrity of respective modules in the boiler system includes considering an operating state of software and an existence of the boiler combustion model.

5. The system according to claim 1,
   wherein the combustion optimization operation includes a first analysis method based on the collected operation data of the boiler, a second analysis method based on the collected state data of the boiler, and a third analysis method based on previously stored data, the previously stored data including a plurality of operating states of the boiler and manipulations performed by an operator of the boiler that correspond respectively to the plurality of operating states.

6. The system according to claim 1, wherein the CPU is further configured to execute a program step of:
   creating the boiler combustion model to be used in the combustion optimization operation for the boiler.

7. The system according to claim 6, wherein the CPU is further configured to execute a program step of:
   creating an arbitrary boiler combustion model by filtering data required for the boiler combustion mode.

8. A method for controlling an operation of a boiler, the method comprising:
   collecting operation data and state data of the boiler while under operation;
   checking a current operating state of the boiler based on the collected operation data of the boiler and the collected state data of the boiler;
   determining, based on the checking, whether to perform a combustion optimization operation for the boiler;
   performing, based on the determination, the combustion optimization operation for the boiler using a boiler combustion model to calculate an optimum control value for a plurality of control objects of the boiler, the plurality of control objects including control of an amount of coal that is fed from a coal feeder to a combustion chamber of the boiler and an adjustment of a damper angle of each of a plurality of dampers installed in the boiler;
   updating the optimum control value for a preset period of time; and controlling the plurality of control objects of the boiler according to the optimum control value for a plurality of sub-periods of time each shorter than the preset period of time,
wherein the collected operation data of the boiler includes measurements that are received from sensors installed in the currently operating boiler and that indicate each of:
a power output generated by the amount of coal controlled according to the optimum control value;
a command value configured to perform each of the control of the amount of coal that is fed from the coal feeder to the combustion chamber of the boiler, and the adjustment of the damper angle of each of the plurality of dampers; and
an instantaneous value measured according to each of the controlled amount of coal, and the adjusted damper angle of each of the plurality of dampers, and
wherein the collected state data of the boiler includes:
a value indicating a fluctuation in a boiler output;
a value indicating a fluctuation in the amount of the coal fed from the coal feeder;
a value indicating a temperature in each of a plurality of components of the boiler; and
a value indicating a pressure in each of the plurality of components of the boiler,
wherein the plurality of components of the boiler includes the plurality of dampers installed in the boiler.

9. The method according to claim 8, wherein the plurality of control objects of the boiler are controlled by a variation allowed during each of the plurality of sub-periods of time.

10. The method according to claim 8,
wherein the preset period of time is divided into the plurality of sub-periods of time, and
wherein the plurality of control objects of the boiler are controlled by a same variation for each of the plurality of sub-periods of time.

11. The method according to claim 8,
wherein the determining whether to perform the combustion optimization operation includes determining whether a power plant including the boiler is stabilized, and otherwise determining that the power plant is not stabilized, by considering an integrity of the system and an integrity of respective modules in the boiler,
wherein the considering the integrity of the system includes considering an operating state of hardware, a system resource status, and a communication environment, and
wherein the considering the integrity of respective modules in the boiler system includes considering an operating state of software and an existence of the boiler combustion model.

12. The method according to claim 8,
wherein the combustion optimization operation includes a first analysis method based on the collected operation data of the boiler, a second analysis method based on the collected state data of the boiler, and a third analysis method based on previously stored data, the previously stored data including a plurality of operating states of the boiler and manipulations performed by an operator of the boiler that correspond respectively to the plurality of operating states.

13. The method according to claim 8, further comprising using an artificial neural network to create the boiler combustion model to be used in the combustion optimization operation for the boiler.

14. The method according to claim 13, further comprising filtering data required in creating the boiler combustion model.

15. A non-transitory computer-readable storage medium storing instructions of executing a method of controlling an operation of a boiler, the method comprising:
collecting operation data and state data of the boiler while under operation;
checking a current operating state of the boiler based on the collected operation data of the boiler and the collected state data of the boiler;
determining, based on the checking, whether to perform a combustion optimization operation for the boiler;
performing, based on the determination, the combustion optimization operation for the boiler using a boiler combustion model to calculate an optimum control value for a plurality of control objects of the boiler, the plurality of control objects including control of an amount of coal that is fed from a coal feeder to a combustion chamber of the boiler and an adjustment of a damper angle of each of a plurality of dampers installed in the boiler;
updating the optimum control value for a preset period of time; and
controlling the plurality of control objects of the boiler according to the optimum control value for a plurality of sub-periods of time each shorter than the preset period of time,
wherein the collected operation data of the boiler includes measurements that are received from sensors installed in the currently operating boiler and that indicate each of:
a power output generated by the amount of coal controlled according to the optimum control value;
a command value configured to perform each of the control of the amount of coal that is fed from the coal feeder to the combustion chamber of the boiler, and the adjustment of the damper angle of each of the plurality of dampers; and
an instantaneous value measured according to each of the controlled amount of coal, and the adjusted damper angle of each of the plurality of dampers, and
wherein the collected state data of the boiler includes:
a value indicating a fluctuation in a boiler output;
a value indicating a fluctuation in the amount of the coal fed from the coal feeder;
a value indicating a temperature in each of a plurality of components of the boiler; and
a value indicating a pressure in each of the plurality of components of the boiler,
wherein the plurality of components of the boiler includes the plurality of dampers installed in the boiler.

16. The non-transitory computer-readable storage medium according to claim 15,
wherein the determining whether to perform the combustion optimization operation includes determining whether a power plant including the boiler is stabilized, and otherwise determining that the power plant is not stabilized, by considering an integrity of the system and an integrity of respective modules in the boiler,
wherein the considering the integrity of the system includes considering an operating state of hardware, a system resource status, and a communication environment, and wherein the considering the integrity of respective modules in the boiler system includes considering an operating state of software and an existence of the boiler combustion model.

17. The non-transitory computer-readable storage medium according to claim 15,
wherein the combustion optimization operation includes a first analysis method based on the collected operation data of the boiler, a second analysis method based on the collected state data of the boiler, and a third analysis method based on previously stored data, the previously stored data including a plurality of operating states of the boiler and manipulations performed by an operator of the boiler that correspond respectively to the plurality of operating states.

* * * * *